(12) United States Patent
Hawkins et al.

(10) Patent No.: US 9,206,812 B2
(45) Date of Patent: *Dec. 8, 2015

(54) PUMP SEAL WITH THERMAL RETRACTING ACTUATOR

(71) Applicant: Westinghouse Electric Company LLC, Cranberry Township, PA (US)

(72) Inventors: Phillip J. Hawkins, Irwin, PA (US); Judith E. Hodgson, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 431 days.

This patent is subject to a terminal disclaimer.

(21) Appl. No.: 13/970,899

(22) Filed: Aug. 20, 2013

(65) Prior Publication Data

US 2014/0271288 A1    Sep. 18, 2014

Related U.S. Application Data

(63) Continuation-in-part of application No. 13/798,632, filed on Mar. 13, 2013.

(60) Provisional application No. 61/862,304, filed on Aug. 5, 2013.

(51) Int. Cl.
*F16J 15/16* (2006.01)
*F04D 29/14* (2006.01)
(Continued)

(52) U.S. Cl.
CPC ............. *F04D 29/146* (2013.01); *F03G 7/06* (2013.01); *F04D 7/08* (2013.01); *F04D 29/12* (2013.01); *F16J 15/164* (2013.01)

(58) Field of Classification Search
CPC ......... F16J 15/164; F16J 15/00; F16J 15/188; F16J 15/28; F16J 15/54; F16J 15/16; F04D 29/12; F04D 29/14; F04D 29/146; F04D 29/122; F04D 29/126; F04D 29/10; F04D 7/08; F16C 33/7816; F03G 7/06

USPC ......... 277/542, 929, 471, 472, 473, 474, 467, 277/484, 486; 415/136, 230, 174.1
See application file for complete search history.

(56) References Cited

U.S. PATENT DOCUMENTS 2,807,483 A * 9/1957 Cornelius .................. 277/561
3,035,841 A * 5/1962 Riester ................. F16J 15/008
                                                         277/348

(Continued)

FOREIGN PATENT DOCUMENTS

JP         2013-151922 A     8/2013
KR         10-0304858 B1     9/2001

OTHER PUBLICATIONS

International Search Report and Written Opinion of the International Searching Authority for PCT/US2014/015487 dated Jun. 20, 2014 (Forms PCT/ISA/220, PCT/ISA/210, PCT/ISA/237).

(Continued)

*Primary Examiner* — Devon Kramer
*Assistant Examiner* — Nathan Zollinger
(74) *Attorney, Agent, or Firm* — Joseph C. Spadacene; Westinghouse Electric Company LLC

(57) ABSTRACT

A thermal actuator for a rotating shaft shutdown seal that has a piston with a portion of its axial length enclosed within a chamber shell with a material that expands upon a rise in temperature. The portion of the actual length of the piston within the chamber has at least two different diameters with the larger diameter leading in the direction of travel of the piston. Upon a rise in temperature, expansion of the material surrounding the piston within the chamber creates a force on the piston in the desired direction of travel. Below a preselected temperature the piston is positively locked with a passive release when the preselected temperature is reached.

21 Claims, 11 Drawing Sheets

(51) Int. Cl.
  *F03G 7/06* (2006.01)
  *F04D 29/12* (2006.01)
  *F04D 7/08* (2006.01)

(56) References Cited

U.S. PATENT DOCUMENTS

| | | | |
|---|---|---|---|
| 3,347,552 A | 10/1967 | Frisch | |
| 3,522,948 A | 8/1970 | MacCrum | |
| 3,529,838 A | 9/1970 | Singleton | |
| 3,632,117 A | 1/1972 | Villasor | |
| 3,720,222 A | 3/1973 | Andrews et al. | |
| 4,105,040 A * | 8/1978 | Chester | 137/72 |
| 4,202,553 A * | 5/1980 | Kropp | F16J 15/54 277/366 |
| 4,275,891 A | 6/1981 | Boes | |
| 4,302,020 A * | 11/1981 | Morales | 277/530 |
| 4,331,337 A | 5/1982 | Cross et al. | |
| 5,217,232 A * | 6/1993 | Makhobey | F16J 15/164 277/411 |
| 5,586,155 A | 12/1996 | Erbes et al. | |
| 6,332,011 B1 | 12/2001 | Johnson | |
| 6,371,488 B1 * | 4/2002 | Szymborski | F04D 29/126 277/358 |
| 8,356,972 B2 * | 1/2013 | Howard et al. | 415/136 |
| 8,690,534 B1 * | 4/2014 | Janocko et al. | 415/231 |
| 2007/0140877 A1 | 6/2007 | Sanville et al. | |
| 2007/0172367 A1 | 7/2007 | Janocko | |
| 2013/0170594 A1 | 7/2013 | Bass et al. | |
| 2015/0108721 A1 * | 4/2015 | Thuillier | F16J 15/008 277/522 |

OTHER PUBLICATIONS

Machine Translation of KR10-0304858 (KIPO).
International Search Report and Written Opinion of the International Searching Authority for PCT/US2014/041291 dated Nov. 27, 2014 (Forms PCT/ISA/220, PCT/ISA/210, PCT/ISA/237).

* cited by examiner

PUMP SEAL WITH THERMAL RETRACTING ACTUATOR

CROSS REFERENCE TO RELATED APPLICATION

This application is a continuation-in-part of parent application Ser. No. 13/798,632, filed Mar. 13, 2013, entitled "Pump Seal With Thermal Retracting Actuator," and claims priority under 35 U.S.C. §119(e) to U.S. Provisional Patent Application Ser. No. 61/862,304, filed Aug. 5, 2013, entitled "Reactor Coolant Pump Shut Down Seal Thermal Retracting Actuator With Thermal Safety Lock."

BACKGROUND

1. Field

This invention pertains generally to rotary shaft seals and, more particularly to a thermally actuated seal for a centrifugal pump and in particular to a new thermal actuator for such a seal.

2. Related Art

In pressurized water nuclear power plants a reactor coolant system is used to transport heat from the reactor core to steam generators for the production of steam. The steam is then used to drive a turbine generator for the production of useful work. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example, 550° F. (280° C.) and at pressures of approximately 2,250 psia (155 bar). The pump basically includes three general sections from bottom to top; hydraulic, shaft seal and motor sections. The lower hydraulic section includes an impeller mounted on a lower end of the pump shaft which is operable within the pump casing to pump reactor coolant about the respective loop. The upper motor section includes a motor which is coupled to drive the pump shaft. The middle shaft seal section includes three tandem seal assemblies; lower primary (number 1 seal), middle secondary, and upper tertiary seal assemblies. The seal assemblies are located concentric to, and near the top end of, the pump shaft and their combined purpose is to provide for minimal reactor coolant leakage along the pump shaft to the containment atmosphere during normal operating conditions. Representative examples of pump shaft seal assemblies known in the prior art are described in U.S. Pat. Nos. 3,522,948; 3,529,838; 3,632,117; 3,720,222 and 4,275,891.

The pump shaft seal assemblies which mechanically seal the interface between the stationary pump pressure boundary and the rotating shaft, must be capable of containing the high system pressure (approximately 2,250 psi (155 bar)) without excessive leakage. The tandem arrangement of three seal assemblies is used to break down the pressure in stages. These three mechanical pump seal assemblies are controlled leakage seals which in operation, allow a minimal amount of controlled leakage at each stage while preventing excessive leakage of the reactor coolant from the primary coolant system to the respective seal leakoff ports.

The pump seal assemblies are normally maintained at temperatures well below those of the primary coolant system, either through the injection of cool fluid at the seal assemblies or through the use of a heat exchanger which cools the primary fluid before it reaches the seal assemblies. Theorized failure of these systems may expose the seal assemblies to high temperatures which will likely cause the controlled leakage of the seal assemblies to increase dramatically. When the cause of the loss of all nuclear fuel cooling in the reactor core is due to losing all AC power, the seal leakoff has no means of returning to the coolant system without electricity to power the makeup pumps. Controlled leakage without the means of makeup could hypothetically lead to reactor coolant uncovering the reactor core and subsequent core damage.

Consequently, a need exists for an effective way to back up the standard seal assemblies in the event of a coincidental loss of all fuel cooling and loss of makeup pumping. Preferably, such a back up seal should be operable upon loss of power or other cause for the loss of makeup pumping capacity to substantially seal the shaft from leakage.

SUMMARY

The foregoing objectives are achieved, in accordance with this invention, by a thermally actuated shutdown seal for a shaft of reduced speed or stopped rotating equipment such as a pump, compressor or the like, that is designed to restrict the normal leakage of coolant through a shaft seal. The shutdown seal claimed hereafter is useful for sealing any equipment having a narrow flow annulus between its shaft and housing.

The shutdown seal is characterized by a "split ring" that is designed (i) to surround the shaft with an annulus therebetween during normal operation and (ii) to constrict against the shaft when the shaft slows below a predetermined speed or stops rotating. The split ring has confronting ends that are maintained in spaced relationship by a spacer when the shaft is rotating during normal online operation. When the shaft slows or stops rotating and the temperature in the housing rises, the spacer is removed from the confronting ends of the split ring and the split ring constricts against the shaft as the confronting ends of the split ring approach each other, which blocks a substantial portion of the leakage of coolant through the annulus.

Preferably, the shutdown seal also has a pliable polymer seal ring which is urged against the shaft by an increase in pressure in the housing when the split ring blocks the leakage of coolant through the annulus.

In particular, this invention provides such a seal with an improved actuator for removing the spacer from between the confronting ends of the split ring when the liquid in the annulus rises above a preselected temperature so the split ring can constrict to narrow or substantially seal the portion of the annulus covered by the split ring. The actuator includes a cylinder having an axial dimension with a piston axially moveable within the cylinder with the cylinder having an upper and lower end which is sealed around the piston. A piston rod is connected at one end to the piston and at another end to the spacer. A cavity occupies a space within the cylinder between the upper and lower ends, through which space the piston travels. An axial dimension of the piston extends through the space within the cavity when the spacer is disposed between the confronting ends of the split ring. The axial dimension of the piston has at least two separate diameters with a largest of the diameters leading a smaller of the diameters in a direction of travel of the piston to remove the spacer from the confronting ends of the split ring. A material occupies at least a portion of the space within the cavity. The material expands upon an increase in temperature to exert a force on the piston that causes the piston to move in a direction to remove the spacer from between the confronting ends when the material rises above a preselected temperature. Preferably, the force is exerted over an area around a circumference of the piston wherein at least a portion of the at least two diameters of the piston extend.

In one embodiment, the actuator includes a first seal supported between the cavity and the piston at a lower end of the cavity and a second seal supported between the cavity and the piston at an upper end of the cavity with the first and second seals being operable to confine the material to the cavity. Preferably, the first and second seals are cup seals and are constructed of PEEK. In this embodiment, the actuator may also include backup seals for either or both of the first and second seals. Preferably, the backup seals are O-ring seals and desirably, the O-ring seals are formed from EPDM or HNBR. In another embodiment, the support for the first seal or a support for the second seal is designed to relieve a pressure within the cavity when the pressure exceeds a predetermined value and, desirably, the material is in thermal communication with the liquid.

In another embodiment the actuator includes a thermally activated safety lock configured to prevent the piston from moving in the cylinder in a direction that will remove the spacer from between the confronting ends of the split ring when the material is below the preselected temperature and free the piston to move and remove the spacer from confronting ends of the split ring when the material rises above the preselected temperature. Preferably, the thermal safety lock is configured to passively unlock the piston when the fluid is above the preselected temperature. In one embodiment the thermally activated safety lock comprises a pin that is suspended from one end of the cylinder and extends in a direction that the piston moves to remove the spacer from the confronting ends of the split ring. The pin extends at least partially within a recess in an end of the piston. A substantial remainder of the recess is substantially filled with a thermally activated material, wherein the thermally activated material has a viscosity at temperatures below the preselected temperature that prevents the thermally activated material from flowing alongside a side of the pin and out of the recess. At temperatures substantially at or above the preselected temperature the thermally activated material has a reduced viscosity that enables it to flow alongside the side of the pin and out of the recess. The resulting displacement of the thermally activated material enables the piston to move in a direction to remove the spacer from between the confronting ends of the split ring. The thermally activated material may, for example be a polymer such as polyethylene.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
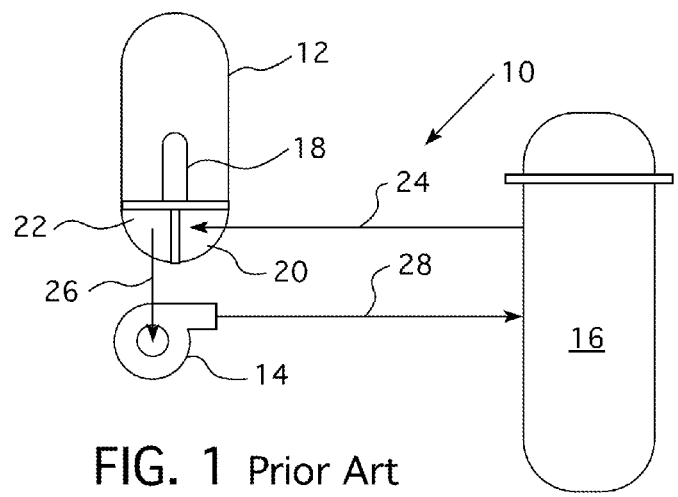
FIG. 1 is a schematic representation of one cooling loop of a conventional nuclear reactor cooling system which includes a steam generator and reactor coolant pump connected in series in a closed loop system with the reactor.

In the following description, like reference characters designate like or corresponding parts throughout the several view. Also, in the following description, it should be understood that such terms of direction as "forward," "rearward," "left," "right," "upwardly," "downwardly," and the like, are words of convenience and are not to be construed as limiting terms.

Prior Art Reactor Cooling Pump

To understand the invention, it is helpful to understand one environment in which the invention will operate. However, it should be appreciated that the invention has many other applications. Referring to FIG. 1, there is shown a schematic representation of one of a plurality of reactor coolant loops 10 of a conventional nuclear reactor coolant system. The coolant loop 10 includes a steam generator 12 and reactor coolant pump 14 connected in series in a closed loop coolant system with the nuclear reactor 16. The steam generator 12 includes primary heat exchange tubes 18 communicating with inlet and outlet plenums 20, 22 of the steam generator 12. The inlet plenum 20 of the steam generator 12 is connected in flow communication with the outlet of the reactor core 16 for receiving hot coolant therefrom along flow path 24, commonly referred to as the hot leg of the closed loop system. The outlet plenum 22 of the steam generator 12 is connected in flow communication with an inlet section side of the reactor coolant pump 14 along flow paths 26 of the closed loop system. The outlet pressure side of the reactor coolant pump 14 is connected in flow communication with the inlet of the reactor core 16 for feeding relatively cold coolant thereto along flow path 28 of the cold leg of the closed loop system.

The coolant pump 14 pumps the coolant under high pressure about the closed loop system. Particularly, hot coolant emanating from the reactor 16 is conducted to the inlet plenum 20 of the steam generator 12 and through the heat exchange tubes 18 in communication therewith. While in the heat exchange tubes 18, the hot coolant flows in heat exchange relationship with cool feedwater supplied to the steam generator 12 via a conventional means (not shown). The feedwater is heated and portions thereof is changed to steam for use in driving a turbine generator (not shown). The coolant, whose temperature has been reduced by the heat exchange, is then recirculated to the reactor 16 via the coolant pump 14.

The reactor coolant pump 14 must be capable of moving large volumes of reactor coolant at high temperatures and pressures about the closed loop system. Although, the temperature of the coolant flowing from the steam generator 12 through the pump 14 as a result of the heat exchange has been cooled substantially below the temperature of the coolant flowing to the steam generator 12 from the reactor 16 before heat exchange, its temperature is still relatively high being typically about 550° F. (288° C.). To maintain the coolant in a liquid state at these relatively high temperatures, the system is pressurized by injection pumps (not shown) and operates at pressures that are approximately 2,250 psia (155 bar).

Figure 2:
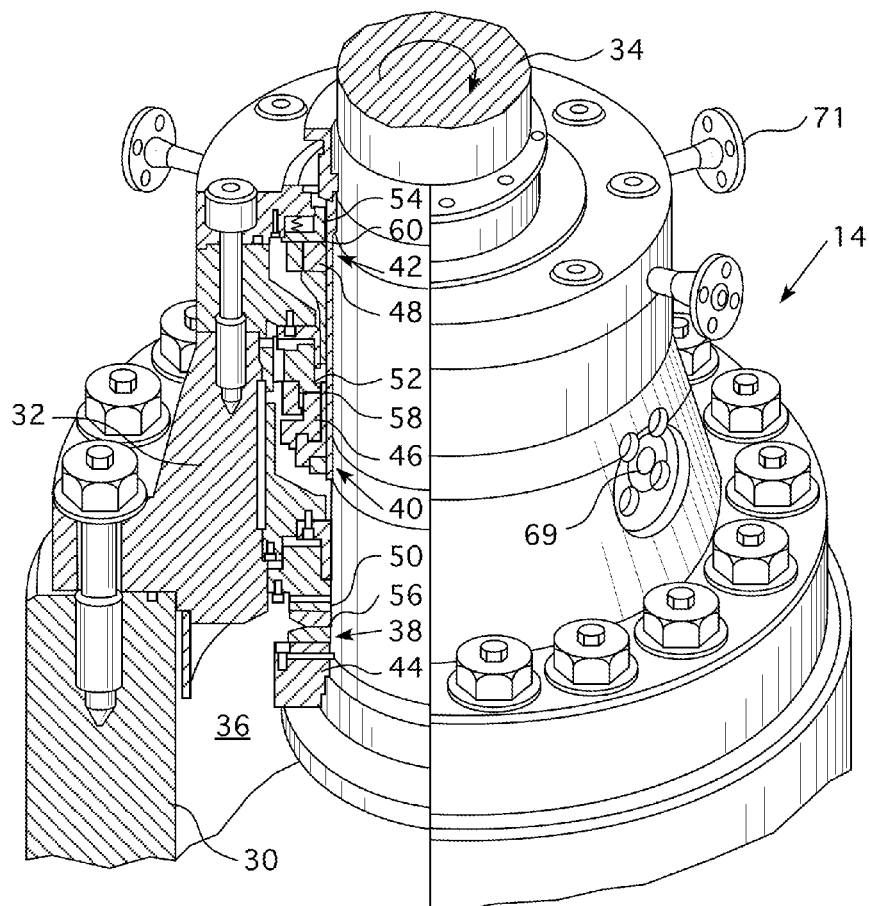
FIG. 2 is a cutaway perspective view of the shaft seal section of a reactor coolant pump, illustrating in cross section the seal housing and the lower primary, middle secondary, and upper tertiary seal assemblies which are disposed within the seal housing and surround the pump shaft.
Figure 3:
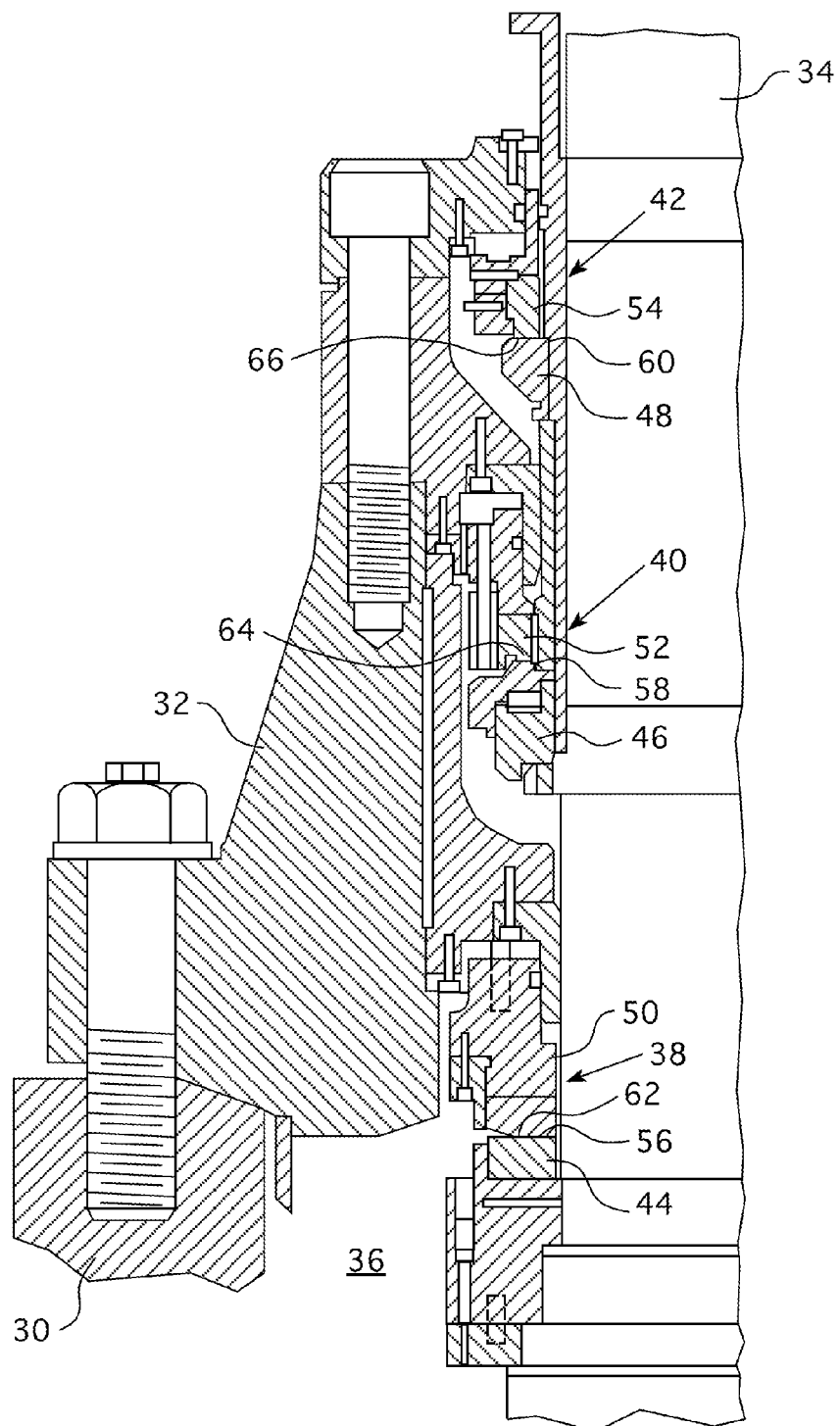
FIG. 3 is an enlarged cross sectional view of a portion of the seal housing and seal assemblies of the reactor coolant pump of FIG. 2.

As seen in FIGS. 2 and 3, the prior art reactor coolant pump 14 generally includes a pump housing 30 which terminates at one end in a seal housing 32. The pump also includes a pump shaft 34 extending centrally of the pump housing 30 and being sealed and rotatably mounted within the seal housing 32. Although not shown, the bottom portion of the pump shaft 34 is connected to an impeller, while a top portion thereof is connected to a high horsepower, induction type electric motor. When the motor rotates the shaft 34, the impeller within the interior 36 of the pump housing 30 causes the pressurized reactor coolant to flow through the reactor coolant system. This pressurized coolant applies an upwardly directed hydrostatic load upon the shaft 34 since the outer portion of the seal housing 32 is surrounded by the ambient atmosphere.

In order that the pump shaft 34 might rotate freely within the seal housing 32 while maintaining the 2,250 psia (155 bar) pressure boundary between the pump housing interior 36 and the outside of the seal housing 32, tandemly arranged lower primary, middle secondary and upper tertiary seal assemblies 38, 40, 42 are provided in the positions illustrated in FIGS. 2 and 3 about the pump shaft 34 within the seal housing 32. The lower primary seal 38 which performs most of the pressure sealing (approximately 2,200 psi (152 bar)) is of the noncontacting hydrostatic type, whereas the middle secondary and upper tertiary seal assemblies 40, 42 are of the contacting or rubbing mechanical type.

Each of the seal assemblies 38, 40, 42 of the pump 14 generally includes a respective annular runner 44, 46, 48 which is mounted to the pump shaft 34 for rotation therewith and a respective annular seal ring 50, 52, 54 which is stationarally mounted within the seal housing 32. The respective runners 44, 46, 48 and the seal rings 50, 52, 54 have top and bottom surfaces 56, 58, 60 and 62, 64, 66 which face one another. The facing surfaces 56, 62 of the runner 44 and seal ring 50 of the lower primary sealing assembly 38 normally do not contact one another but instead a film of fluid normally flows between them. On the other hand, the face surfaces 58, 64 and 60, 66 of the runners and seal rings 46, 52 and 48, 54 of the middle secondary and upper tertiary seal assemblies 40 and 42 normally contact or rub against one another.

Because the primary sealing assembly 38 normally operates in a film-riding mode, some provision must be made for handling cooling fluid which "leaks off" in the annular space between the seal housing 32 and the shaft 34 rotatably mounted thereto. Accordingly, the seal housing 32 includes a primary leakoff port 69, whereas leakoff ports 71 accommodate coolant fluid leakoff from the secondary and tertiary seal assemblies 40, 42.

Figure 4:
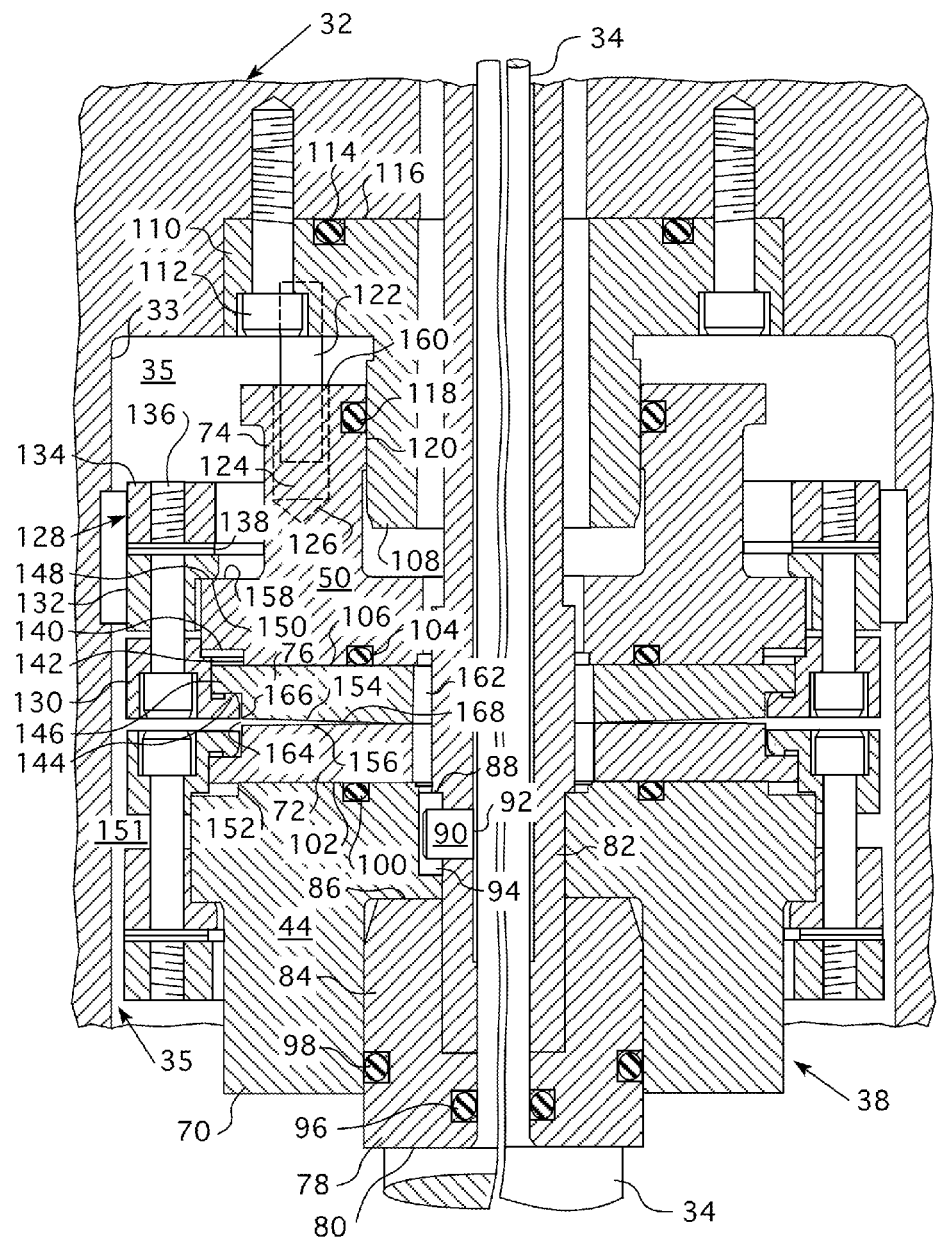
FIG. 4 is a sectional view of the shaft seal arrangement showing an enlarged view of the lower primary seal shown in FIGS. 2 and 3, to which this invention may be applied.

FIG. 4 is a cross section of the seal housing in the area of the number 1 or primary lower seal of the type illustrated in FIGS. 2 and 3 and provides a better understanding of the operation of the number 1 seal and how it will interface with this invention. The structure shown comprises a housing 32 having annular wall 33 adapted to form a pressure chamber 35 within the housing 32; a shaft 34 rotatably mounted within the housing 32; a seal runner assembly 44 and a seal ring assembly 50 disposed within the housing 32. As previously mentioned, the shaft 34 may be driven by a suitable motor (not shown) and utilized to drive the impeller of a centrifugal pump (not shown) which circulates the coolant in the pressurized system. Injection water may be supplied to the chamber 35 at a higher pressure than that developed by the pump. The runner assembly 44 comprises an annular holder 70 and an annular seal plate 72. Similarly, the seal ring assembly 50 comprises a holder 74 and an annular face plate 76.

The holder 70 rotates with the shaft 34 since it is mounted on an annular support 78 which engages a shoulder 80 on the shaft 34 and is secured to the shaft by means of a sleeve 82 which is assembled onto the shaft 34 between the shaft and an upwardly extending leg 84 of the support 78 which is generally L-shaped in cross section. It should be appreciated that although this embodiment of the invention is being described as applied to a pump that employs a sleeve over the pump shaft, the invention can be employed equally as well on pump shafts that do not employ sleeves. A shoulder 86 on the holder 70 rests on the upper end of the leg 84, and a shoulder 88 on the sleeve 82 retains the holder 70 on the support 84. A pin 90 is pressed into a recess 92 in the sleeve 82 and engages an axial slot 94 in the holder 70. An axial clamping force is exerted on the sleeve 82 and the support 78 from a nut (not shown) which causes the sleeve 82 and the support 78 to rotate with the shaft 34. The pin 90, in turn, causes the holder 70 to rotate with the sleeve 82 which rotates with the shaft 34. O-ring seals 96 and 98 are provided between the support 78 and the shaft 34 and the holder 70, respectively. An O-ring seal 100 is also provided in the interface 102 between the holder 70 and the face plate 72.

The face plate 72 is composed of a corrosion and erosion resistant material having substantially the same coefficient of thermal expansion as the material of which the holder 70 is composed, and the holder 70 has a high elastic modulus. Similarly, the face plate 76 is composed of a corrosion and erosion resistant material having substantially the same coefficient of thermal expansion as the material of the holder 74 which has a high elastic modulus. Examples of suitable materials are carbides and ceramics. An O-ring seal 104 is provided in the interface 106 between the holder 74 and the face plate 76.

The holder 74 is movably mounted on a downwardly extending leg 108 of an annular seal ring insert 110 which is generally L-shaped in cross section. The insert 110 is retained in the housing 32 by cap screws 112. An O-ring seal 114 is provided in the interface between the insert 110 and the housing 32. Similarly, O-ring seal 118 is provided in the interface 120 between the holder 74 and the leg 108 of the insert 110. Rotative movement of the holder 74 is prevented by the pin 122 which is pressed into the insert 110. The pin 122 extends into a well 124 in the holder 74 with sufficient clearance between the wall of the well 126 and the pin 122 to permit axial movement of the holder 74 but limit rotative movement of the holder 74.

The face plate 76 is attached to the holder 74 by clamping means 128 which includes a retainer ring 130, a clamp ring 132, a lock ring 134, a plurality of cap screws 136 and belleville springs 138 mounted on the cap screw 136 between the lock ring 134 and the clamp ring 132. The cap screws 136 extend through the retainer ring 130, the clamp ring 132, the belleville springs 138 and are threaded into the lock rings 134. The interface 106 of the holder 74 is recessed at 140 to provide an annular fulcrum 142 on the interface at an outside diameter which is less than the outside diameter of the interface of the face plate 76. The retainer ring 130 has an inwardly extending flange with a ridge 144 which engages the portion 146 of the face plate 76 extending beyond the fulcrum 142. The clamp ring 132 has an inwardly extending flange with a ridge 148 which engages a face plate 150 on the holder 74. Thus, when the cap screws 136 are tightened to draw the clamp 132 and the retainer ring 130 towards each other, a force is produced which exerts a cantilever effect on the face plate 76 about the fulcrum 142. During the clamping action, the belleville springs 138 are partly compressed and the face plate 76 is deformed by the clamping force.

The face plate 72 is attached to the holder 70 by a clamping means 151 in a manner similar to that described with reference to the face plate 76. However, the fulcrum 152 on the interface 102 of the holder 70 is located closer to the outside diameter of the face plate 72 than is the fulcrum 142 on the holder 74. Thus, the clamping force on the face plate 72 does not produce as much deformation of the face plate about the fulcrum 152 as is produced on the face plate 76. If desired, the fulcrums 142 and 152 may be placed at the same locations with respect to their corresponding face plates.

As previously described, the seal ring 50 is mounted for limited axial movement relative the shaft 34 and the seal runner assembly 44. Also, rotative movement of the seal ring assembly 50 is limited by the anti-rotational pin 122 which fits loosely in the well 124 in the seal ring holder 74. A seal face 154 on the face plate 76 is biased toward the confronting seal face 156 on the face plate 72 by gravity.

In operation of the pump driven by the shaft 34, surfaces 158 and 160 of the seal ring holder 174 are subjected to the full pressure in the high pressure chamber 35. It is desirable to provide a pressure barrier between the high pressure chamber 35 and an annular low pressure region 162 adjacent the sleeve 82. The seal ring assembly is utilized as the pressure barrier means, but permits a controlled amount of fluid leakage flow to the region 162 from the pressure chamber 35 through a seal gap 164 provided between the confronting seal surfaces 154 and 156 on the seal plate 76 and 72, respectively.

During operation, a balanced or equilibrium position of the axially moveable seal ring assembly 50 is maintained in accordance with the pressure on opposing faces of the seal ring assembly. The thickness of the fluid in the gap 164 and, consequently, the amount of leakage flow through the gap 164 is determined by the configuration of the gap 164.

In order to obtain a self-restoration of the relative position of the seal ring assembly 50 and the runner assembly 44 upon a variation in the seal gap 164, a fluid flow path of decreasing thickness is provided from a high pressure edge or extremity 166 to a position between the seal faced extremities. More specifically, in the structure illustrated, the fluid flow path of decreasing thickness extends between the outer edge 166 and an intermediate concentric circle located at 168 on the sealing face 154.

As shown in the present structure, the decreasing flow path thickness is formed by tapering the surface 154 slightly away from the confronting surface 156 of the face plate 72 between the circle 168 and the outer edge 166 of the face plate 76. The angle between the surfaces 154 and 156 shown in the drawing is exaggerated. This configuration or structure is known as a tapered-face seal. The operation of a seal of this type is fully described in U.S. Pat. No. 3,347,552, issued Oct. 17, 1967 to Erling Frisch.

Figure 5:
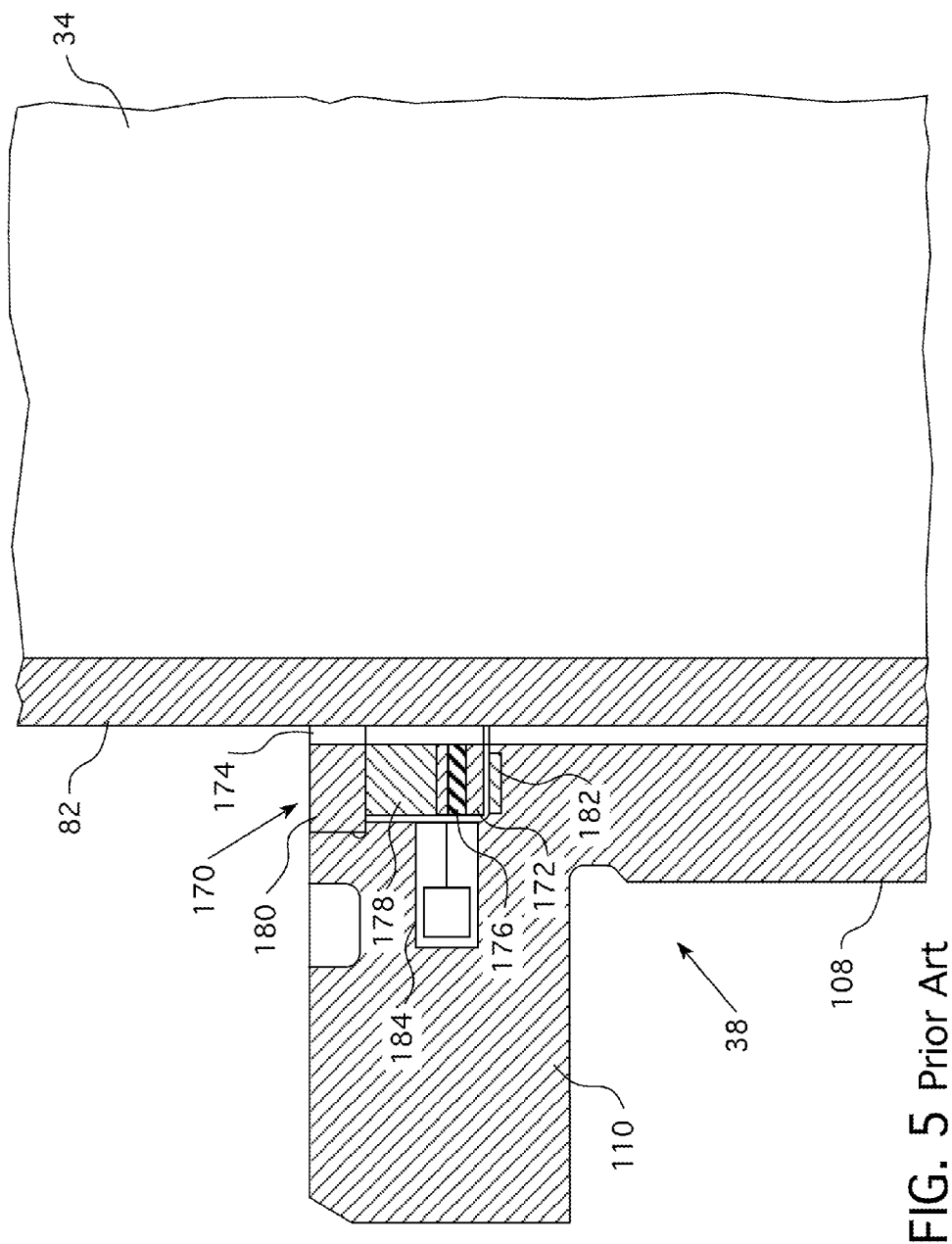
FIG. 5 is an enlarged portion of the insert of a primary seal shown in FIG. 4 with a portion of the pump shaft and the shutdown seal of this invention hatched with the shutdown seal shown as employing a thermally actuated mechanical piston to remove the spacer from the split ring.
Figure 6:
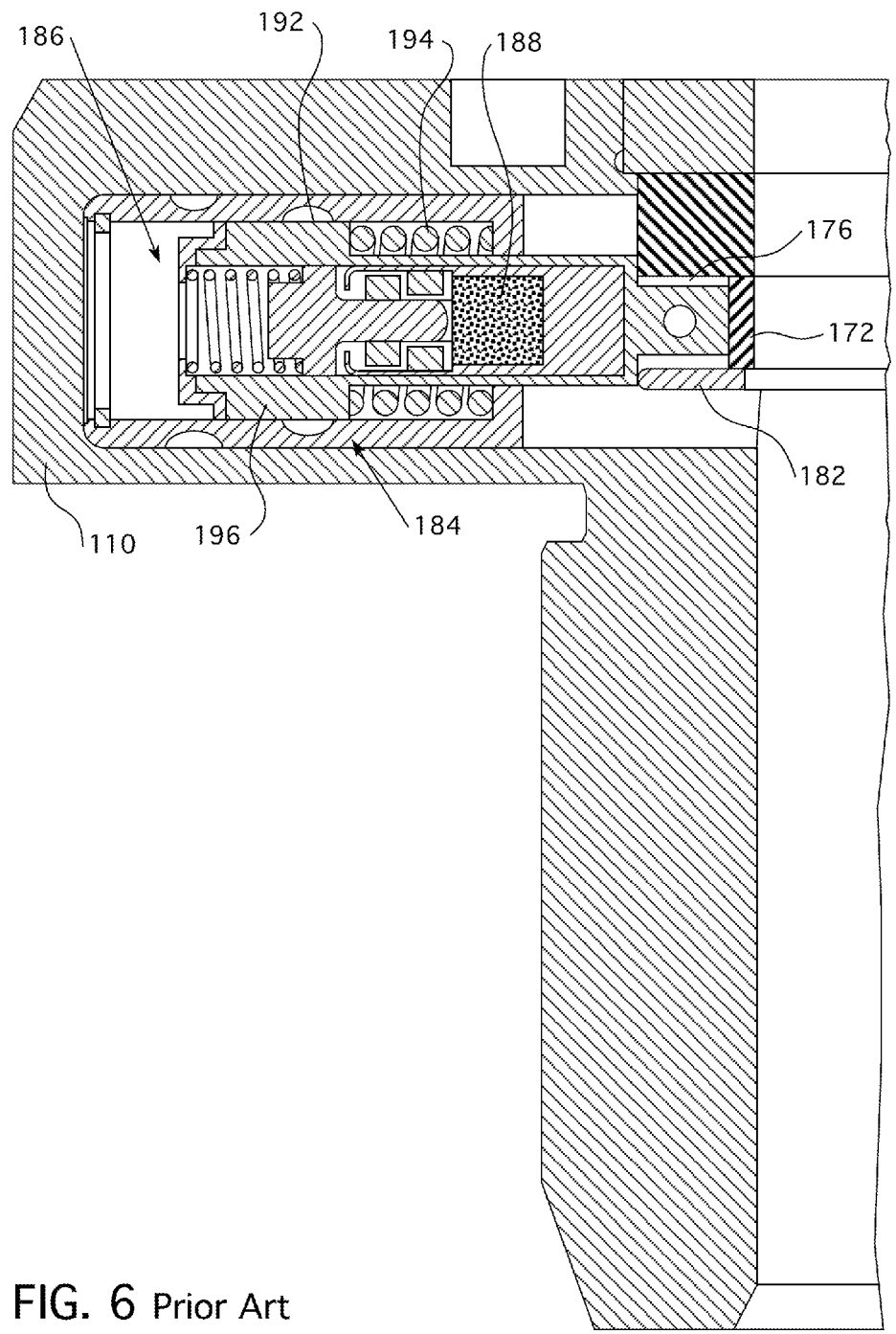
FIG. 6 is an enlarged view of the piston arrangement shown schematically in FIG. 5 with the piston in the fully extended position with the spacer inserted between the opposing ends of the split ring of the shutdown seal that can benefit from this invention.
Figure 7:
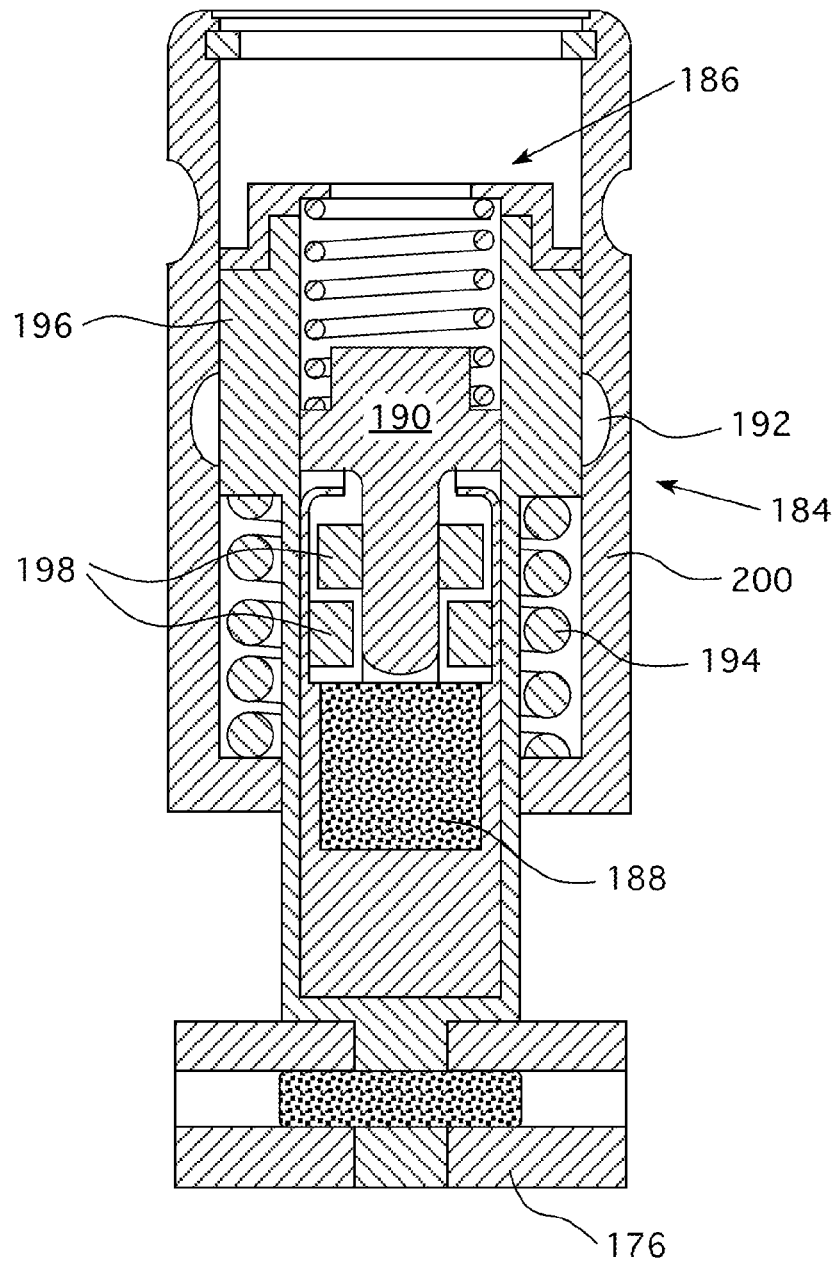
FIG. 7 is a sectional view that shows the piston arrangement of FIG. 8 employed by the prior art showing the piston in a state before an actuation event in which the spacer is removed from between the opposing ends of the split ring.

The current shutdown seal is fully described in U.S. Pat. No. 8,356,972, issued Jan. 22, 2013 and assigned to the Assignee of this invention. The shutdown seal, described in that patent is illustrated in FIGS. 5-7 and provides an additional seal 170 in the pump 14 as a backup safety or shutdown device which is actuatable to prevent excessive leakage along the shaft 34 between it and the seal assemblies 38, 40, 42 of the pump in the event of a loss of seal cooling. As shown in FIG. 5, the shutdown seal 170 is situated in a machined groove in the annular opening in the insert 110 of the primary number 1 seal 38. The shutdown seal is characterized by a "split ring" 172 that is designed (i) to surround the shaft 34 with an annulus 174 therebetween during normal operation and (ii) to constrict against the shaft 34 when the shaft significantly slows or stops rotating after a loss of seal cooling. The split ring 172 is a single piece discontinuous ring member that is split axially and the confronting ends are maintained in a spaced relationship by a spacer 176 during normal pump operation. In FIG. 5, the opposing ends of the split ring 172 are machined in a tongue-and-groove configuration so that the tongue can ride in the groove as the ends of the split ring overlap. In another embodiment, the opposing ends may be butt ended or have a mitered half lap joint so the ends overlap. The spacer 176 is shown in the gap to keep the opposing ends of the split ring 172 from closing on the shaft 34 to maintain the annulus 174 opened for controlled leakage during operation. In accordance with the embodiment illustrated in FIG. 5, the shutdown seal is activated when the temperature of the seal rises as a result of a loss of cooling and preferably rotation as the pump shaft is slowed or stopped. The spacer is responsive to the rise in temperature (either because the shaft has significantly slowed or stopped rotating or for any other reason) to be removed from the confronting ends of the split ring 172. This causes the confronting ends of the split ring to constrict against the shaft 34 as the confronting ends of the split ring approach each other, which blocks the leakage of coolant through the flow annulus 174. Preferably, the split ring and shaft (or shaft sleeve where a sleeve is employed over the shaft) are constructed from gall resistant materials, so that if actuated on a rotating shaft gall balls will not be created which would otherwise serve as a wedge to open a leak path between the sealing surfaces. Materials such as 17-4 stainless for both the split ring and the shaft have proven to work well. A pliable polymer seal ring 178 is preferably situated around the shaft 34 against the split ring 172 between the split ring and a solid retaining seat ring 180. The pliable polymer seal ring 178 is urged against the shaft by an increase in pressure in the housing when the split ring restricts the leakage of coolant through the annulus 174, thus forming a tight seal.

FIG. 5 schematically depicts a shutdown seal 170 of the type described above installed in the reactor coolant pump of FIG. 4. The shutdown seal of FIG. 5 is designed to activate after a loss of seal cooling when the pump shaft 34 slows or is not rotating. The shutdown seal is located within the pump housing, encircling the shaft 34. In the case of the type of reactor coolant pump illustrated in FIGS. 2-4, the number 1 seal insert may be modified to accommodate the shutdown seal by machining out a portion of the inner diameter at the top flange. Until activated, the shutdown seal 170 is substantially completely contained within the space once taken up by the number 1 insert prior to modification, thus substantially unaltering the annulus 174 between it and the shaft 34. In this way, coolant flow through the annulus 174 along the shaft 34 is not substantially impeded during normal operation of the rotating equipment.

FIG. 5 shows a shutdown seal 170 made up of a retractable spacer 176 holding the confronting ends of the split ring 172 open. The retractable spacer 172 is activated by a thermally responsive mechanical device 184, such as the piston 186 described hereafter with regard to FIG. 6. When the spacer 176 is retracted from the ends of the split ring 172, the split ring 172 snaps shut, constricting around the shaft 34, while also remaining retained in the modified number 1 seal insert 110. The split ring 172 sits on a wave spring 182 that forces the split ring 172 up against the seal 178 which pushes against the retaining ring 180. The pressure drop caused by the interruption of the flow through the annulus 174 also forces the split 172 and seal ring 178 upwards, ensuring a tight seal between all of the sealing surfaces. The split ring 172 sits on a wave spring 182 that forces the split ring 172 up against the primary sealing ring 178 to ensure an initial sealing contact so the pressure drop across the split ring 172 is also acting on the primary sealing ring 178.

FIGS. 6 and 7 depict the spacer 176 and actuator assembly 184 before an actuation event. The actuator 184 as shown in FIGS. 6 and 7, is comprised of a canned piston 186 for restraining a spring loaded spacer 176. Within the can is a wax 188 that changes phase at the desired activation temperature, e.g., 280° F. (138° C.) for reactor coolant pumps, as further explained herein. This change in phase results in a substantial increase in volume of the wax 188. For example, a wax such as Octacosane will increase about 17% in volume. When the wax 188 changes phase and expands, it pushes a piston head 190 away from the pump shaft 34. When the piston head 190 moves, balls 192, that were once held in place by the piston 190, will drop out of the way and allow a compressed spring 194 to expand which pushes back the plunger 196 that is connected to the spacer 176. As the spring 194 expands it pushes the plunger which pulls the spacer 176 with it, thus retracting the spacer 176 from between the split ring ends.

Thus, thermal activation is achieved as follows: As temperature rises, the wax 188 changes state and expands. Two HNBR (Hydrogenated Nitrile Butadiene Rubber) O-ring seals 198 are used to contain the wax with the upper O-ring providing a sliding interface for the cam 190. Expansion of the wax translates cam 190 permitting ball bearings in the race 192 to disengage plunger 196 from the housing 200. With the ball bearings disengaged, compression spring 194 translates plunger 196 upward along with spacer 176 thus releasing the piston ring and activating the shutdown seal.

Improved Pump Shutdown Seal Actuator

Figure 8:
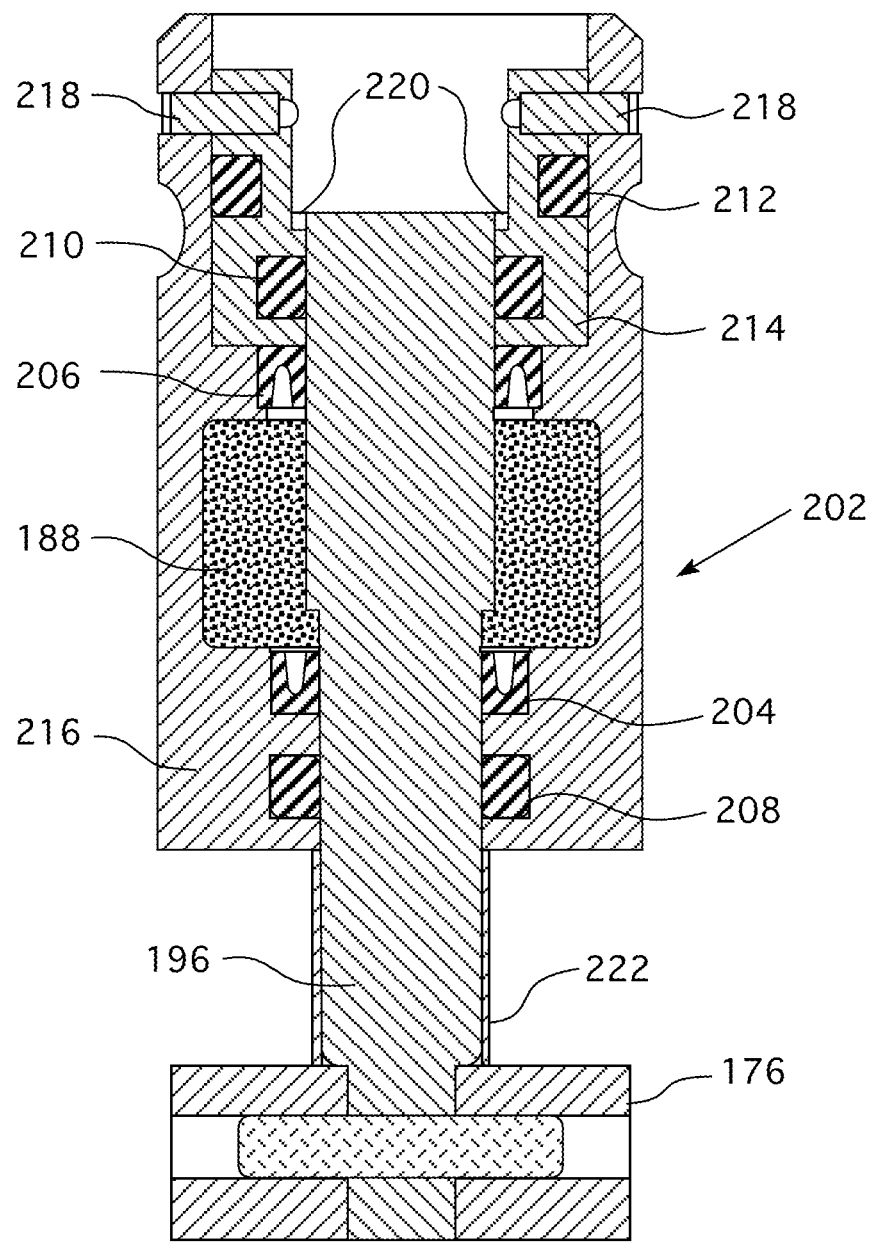
FIG. 8 is a sectional view of an improved actuation mechanism in accordance with this invention which can be applied to remove the spacer of the shutdown seal shown in FIG. 7.

FIG. 8 shows an improved thermal retracting actuator. As described earlier, translation of the spacer 176 permits closure of a split ring enabling activation of the shutdown seal. One end of a piston 196 connects with the spacer 176 while an opposite end of the piston extends through a cylinder/housing 216. The cylinder/housing 216 possesses a cavity, a portion of which is occupied by a material 188, such as wax, which expands upon an increase in temperature. The wax at least partially surrounds a portion of the piston 196 and the piston extends axially through the material as depicted in FIG. 8. When the temperature rises and reaches the phase transition point of the wax 188, the wax volume may increase up to approximately 17%. If the volume is held constant, the wax pressure will increase and can exceed 10,000 pounds per square inch (68,947.6 kpa). Piston 196 has a larger diameter D1 and a smaller diameter D2 with corresponding cross sectional areas A1 and A2 in the region near the wax 188. As the pressure (P) increases, a translational force (F) is applied to the piston 196 equal to the product of wax pressure and the difference in cross sectional areas, i.e., F=P×(A1−A2). With such an arrangement shown in FIG. 8, a typical piston force may be in the range of 50 to 100 pounds (22.7-45.4 kg) while achieving adequate piston travel to remove the spacer 176 from the split ring. This is a significant increase over the approximate force of 15 pounds (6.8 kg) available from the compression spring 194 shown in FIG. 7. Cup seals 204 and 206 provide a pressure boundary for containment of the wax 188. They may be constructed from PEEK (polyetheretherketone) and have sufficient strength to contain the wax 188 at high pressure and are chemically compatible with both the wax and the surrounding reactor coolant. O-ring seals 208, 210 and 212 are made of EPDM (ethylene-propylene diene M-class rubber) or HNBR which are compatible with the reactor coolant. In the event the PEEK seal should fail during activation, the EPDM or HNBR seal can act as a redundant pressure boundary. The EPDM seal can withstand short term exposure to the wax. End cap 214 is free to slide within the housing 216 and is secured in place with multiple shear pins 218. In the event that the piston 196 travels full stroke and the wax pressure continues to rise, pins 218 shear to release end cap 214 permitting seal 206 to decouple from the housing 216 thereby releasing excess wax volume and reducing the pressure to a safe state.

Since the entire retracting assembly 202 can be subjected to higher than atmospheric pressure, several radial openings 220 are oriented about the upper flange of piston 196. Without the radial openings 220 it may be possible that the head of the piston 196 could seal against the mating end cap 214. The external pressure (without radial openings present) could induce an undesirable axial force to the piston 196.

While it may not be required, sleeve 222 is placed over the exposed diameter of piston 196 to maintain the piston free from contaminants which may be present in the surrounding environment. The sleeve may be constructed of polypropylene which may melt when the activation temperature is reached. Alternately, a small wiper may be placed in the end of housing 216 to remove unwanted debris during translation of the piston.

Figure 9:
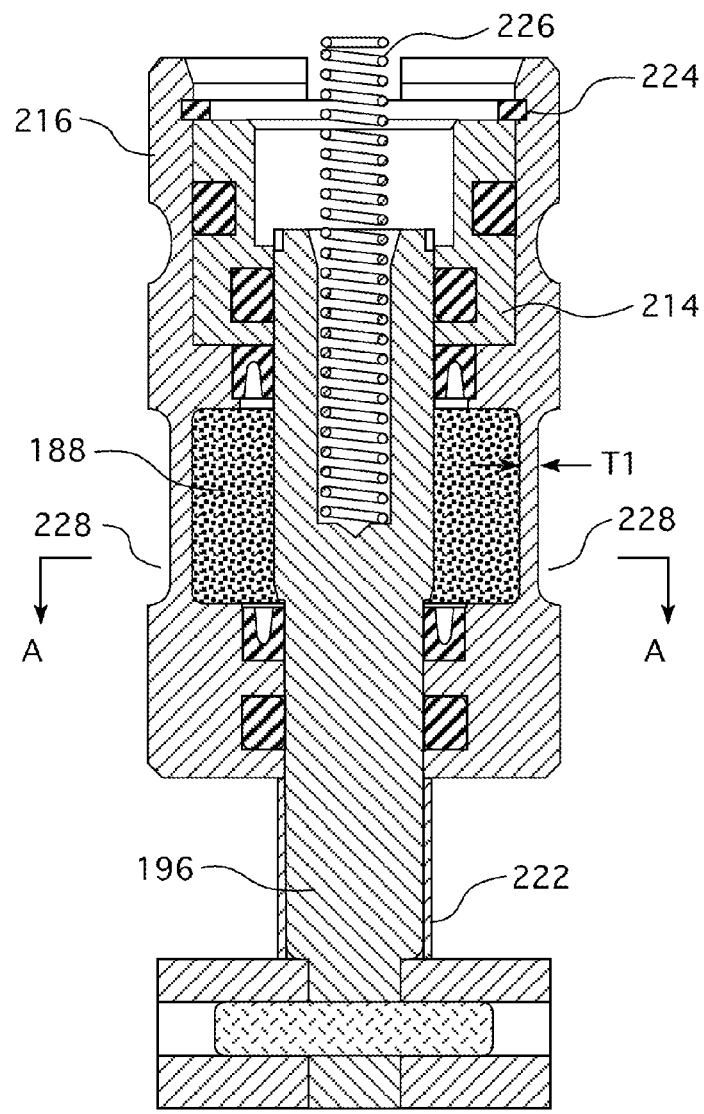
FIG. 9 is a sectional view that shows the piston arrangement of a second embodiment of this invention.

FIG. 9 shows an alternative embodiment off the invention with a different configuration. Alternative end cap 214 is secured in alternative housing with a spiral retaining ring 224. Spring 226 provides a small force to maintain the piston 196 in the extended position prior to actuation.

Figure 10:
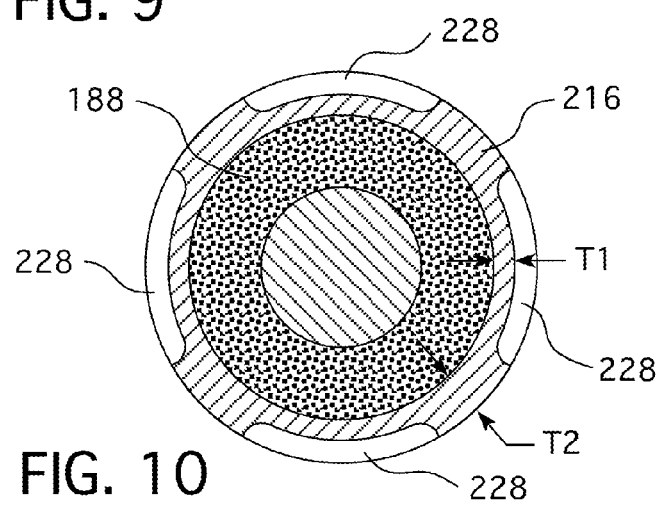
FIG. 10 is a cross-sectional view of the embodiment shown in FIG. 9 taken along the lines A-A thereof.

Housing 216 contains at least two pockets 228 where the wall thickness of the chamber containing the wax is reduced in thickness T1. In the event that the piston 196 travels full stroke and the wax 188 pressure continues to rise, the housing wall can bulge at the pockets 228 thereby releasing excess wax volume and reducing the pressure to a safe state. Section A-A of FIG. 9 is shown in FIG. 10 and illustrates a cross-section of the housing 216 at the location of the pockets 228. The thinner wall (T1) can bulge when the wax pressure becomes excessive. Heavier wall (T2) helps maintain structural integrity of the housing 216.

Another configuration is to have a housing where the thin wall section (T1) is continuous for 360°. Since the actuator will have performed its function at the time when the wax pressure can become excessive, structural integrity from a thicker section (T2) is not necessary.

Figure 11:
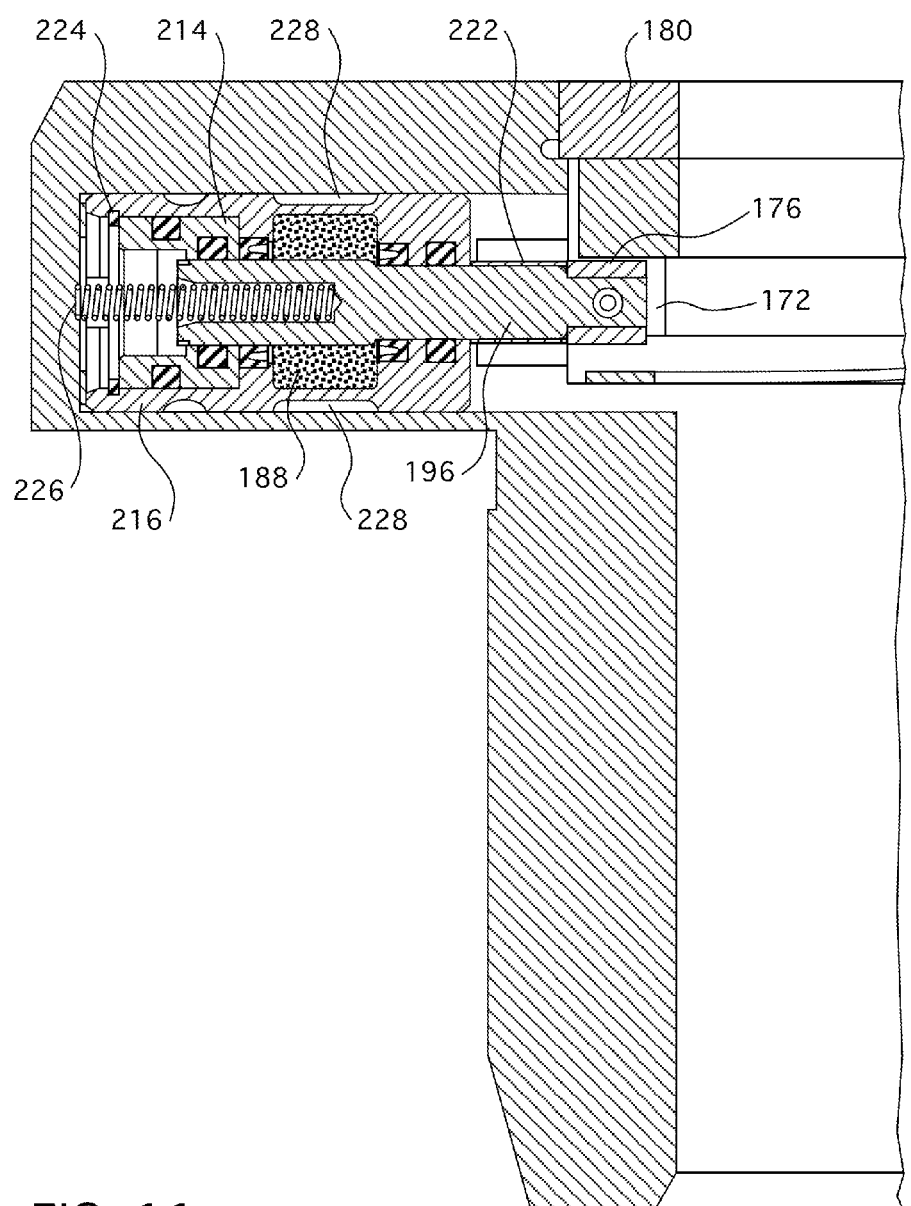
FIG. 11 is an enlarged portion of the insert of the primary seal incorporating the shutdown seal embodiment illustrated in FIGS. 9 and 10.

FIG. 11 shows a cross-section of the alternative retracting actuator as applied to the insert of the primary seal shutdown seal.

Figure 12:
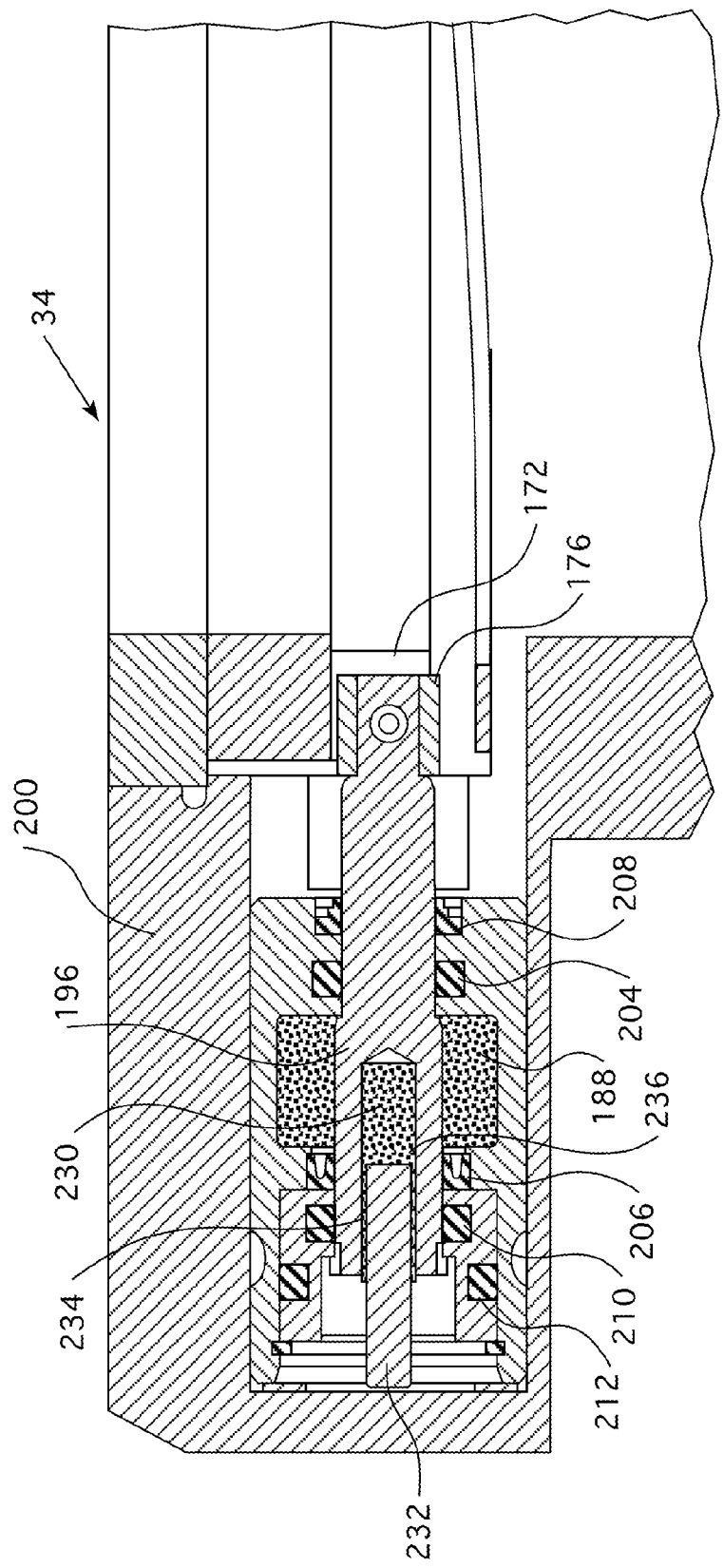
FIG. 12 is a sectional view that shows the piston arrangement of a third embodiment of this invention.

While the foregoing embodiment has a spring to prevent inadvertent movement of the piston, it is highly desirable to provide a more robust mechanism as inadvertent actuation would be extremely costly due to shutdown of the power plant. FIG. 12 illustrates such a robust mechanism.

FIG. 12 shows a third embodiment of the retracting actuator used in the shut down seal. Like reference characters are used among the several figures to designate corresponding components. Thermal activation is achieved when temperature rises causing the wax 188 to change state and expand which gives rise to pressure, as explained above. As the wax pressure increases, a translational force is applied to the piston 196 equal to the product of wax pressure and the difference in cross sectional areas of the piston. Without pin 232 in place, piston 196 translates spacer 172 towards the housing 200. Removal of spacer 176 permits closure of a split piston ring 172 enabling operation of the reactor coolant pump shaft shutdown seal.

A typical piston force may be in the range of 50 to 100 lbs while achieving adequate piston travel to remove the spacer 176 from the split ring 172. O-ring 204 and cup seal 206 provide a pressure boundary for containment of the wax 188. O-ring seals 210 and 212 act as a redundant pressure boundary for the wax and provide isolation from the surrounding fluid from entering the wax chamber. Wiper 208 in conjunction with cup seal 206 are semi-rigid and act as dual bushings keeping piston 196 centered within housing 200. The primary function of wiper 208 is to exclude foreign material from entering into the housing 200. The wiper is also a seal to minimize surrounding fluid from entering new O-ring 204.

In one embodiment, in order to keep piston 196 from translation prior to thermal activation, plug 230 encapsulated in the piston 196 is sufficiently rigid to hold metal pin 232 in place. As can be seen in FIG. 12, plug 230 has a thin wall at location 234 that provides a flexible boundary which allows for a slight press fit between the outside diameter of pin 232 and the inside diameter of a recess 236 in piston 196. The press fit minimizes any motion between the piston 196 and the pin 232. The preferred material for the plug 230 is a polymer such as polyethylene. It is both flexible which makes a good press fit and has a melt temperature very close to the phase change temperature of the wax. Polyethylene is also compatible with the surrounding reactor coolant pump environment. To avoid potential creep, it is important that plug 230 is encapsulated. If a load is applied to pin 232 in the direction of the plug 230, without the plug being contained by the piston 196, the increased force on the plug 230 would cause the plug to creep radially outward and/or buckle. As configured, with an increasing load on the plug 230, the plug would have to extrude along the thin boundary 234 in order to escape. Due to the nature of the polymer bonds, extrusion through the small gap between the pin 232 and the piston 196 is extremely difficult until a higher temperature is obtained. The holding force from the pin/plug combination can easily exceed 100 lbs prior to activation.

During thermal activation, above normal operating temperature, plug 230 becomes soft before the wax begins to change state. As the temperature further increases, the plug can reach melt temperature either prior to or as the piston begins to move. As the plug 230 melts, the plug material becomes viscous and freely flows around pin 232 and subsequently permits translation of pin 232 within the piston recess 236 such that the piston is free to activate the shut down seal.

Figure 13:
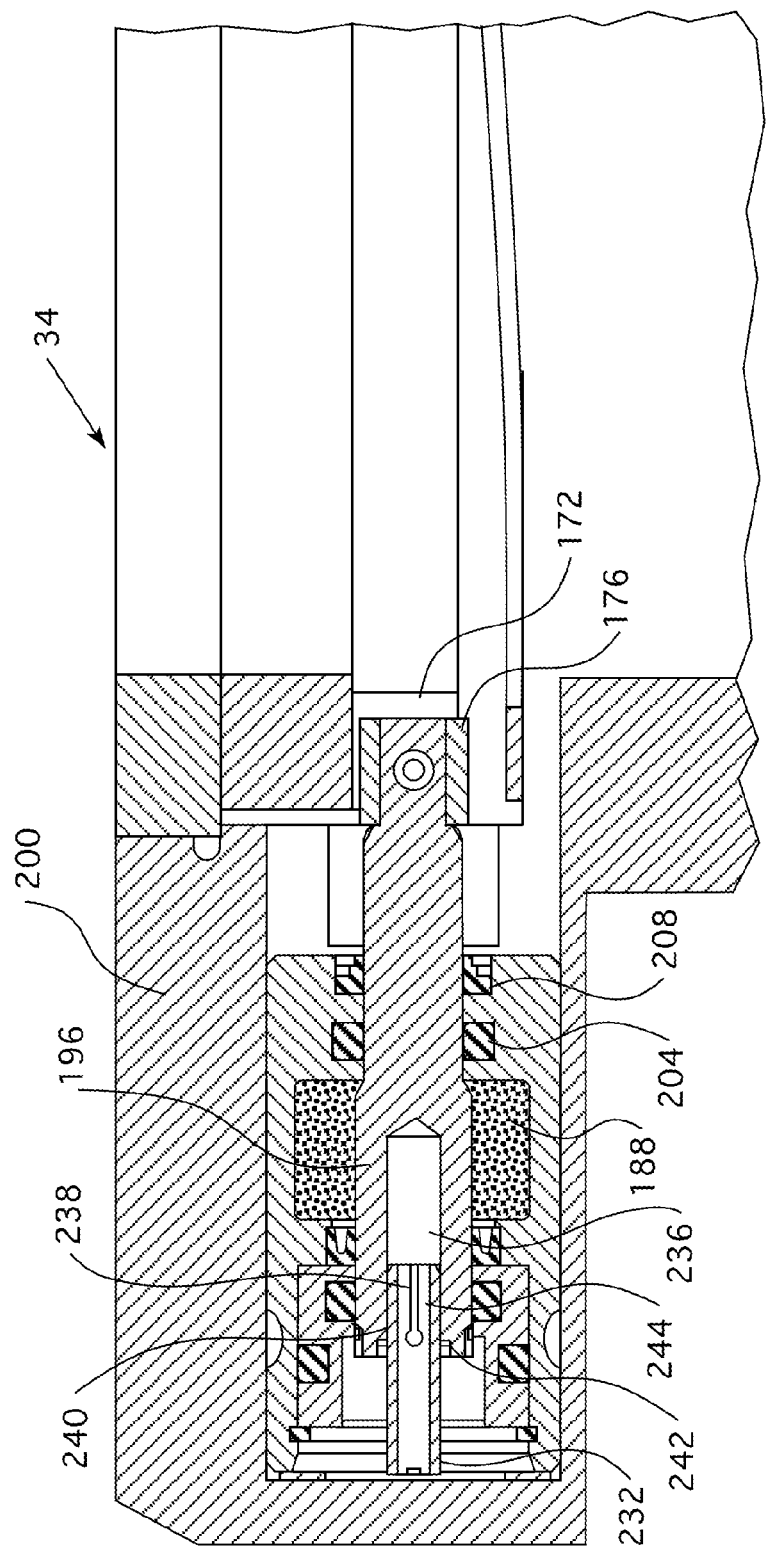
FIG. 13 is a sectional view of an alternate embodiment for locking the piston prior to thermal actuation of the shutdown mechanism.

FIG. 13 shows an alternate embodiment for keeping the piston 196 from translation prior to thermal activation, To prevent the piston 196 from moving prior to actuation, pin 232 is slidably fixed within bore or recess 236. The leafs 244 between slots 238 in pin 232 are elastically biased outward in the radial direction (like a leaf spring) to keep the outside diameter of the pin 232 in intimate contact with the inside diameter of the piston bore 196 at the interface 240. Shear pin projections 242, that extend radially outward from the pin 232 prevent the pin from actuating until the piston 196 exerts sufficient force to shear or break off the projections 242, thereby permitting full travel of the piston 196.

Thus, this improved actuator has a simplified thermal retracting design that has a higher output force and fewer components than the previous design described above. The previous design of the actuator uses HNBR O-rings with the life expectancy which may be less than the desired twelve years of operation. The seal arrangement in the preferred design uses long life EPDM O-rings and PEEK seals to provide separate and redundant boundaries for the thermal retracting actuator components.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pump having an impeller section which is connected to a motor through a shaft that is rotatably supported between the motor and the impeller with a seal housing interposed around the shaft between the motor and the impeller section, the seal housing having a shutdown seal for surrounding the rotating shaft and preventing a fluid in an annulus surrounding the shaft from leaking past the shutdown seal after rotation of the shaft has slowed or stopped, comprising:

a constrictable split ring surrounding the shaft, the split ring having confronting ends and an inner diameter spaced from the shaft when the shaft is rotating, the inner diameter defining a portion of the annulus;

a spacer disposed between the confronting ends of the split ring for maintaining the annular space between the confronting ends during normal operation of the shaft, the spacer is operable to be removed from between the confronting ends when the fluid rises above a pre-selected temperature so the split ring can constrict to narrow or substantially seal a portion of the annulus; and an actuator for removing the spacer from between the confronting ends of the split ring when the fluid rises above the pre-selected temperature so the split ring can constrict to narrow or substantially seal the portion of the annulus, the actuator comprising:

a cylinder having an axial dimension;

a piston axially movable within the cylinder with the cylinder having an upper and a lower end which are sealed around the piston, the piston connecting at one end with the spacer;

a cavity occupying a space within the cylinder between the upper and lower ends and which space at least partially surrounds a portion of the piston, an axial dimension of the piston extending through the space within the cavity when the spacer is disposed between the confronting ends of the split ring, having at least two separate diameters with a largest of the diameters leading a smaller of the diameters in a direction of travel of the piston to remove the spacer from the confronting ends of the split ring; and a material occupying at least a portion of the space within the cavity, the material expanding upon an increase in temperature to exert a force on the piston that causes the piston to move in a direction to remove the spacer from between the confronting ends when the material rises above a pre-established temperature and wherein the piston extends axially through the material occupying at least a portion of the space within the cavity.

2. The pump of claim 1 wherein the force is exerted over an area around a circumference of the piston near which at least a portion of the at least two separate diameters of the piston extend.

3. The pump of claim 1 including a first seal supported between the cavity and the piston at a lower end of the cavity and a second seal supported between the cavity and the piston at an upper end of the cavity, the first and second seals being operable to substantially confine the material to the cavity.

4. The pump of claim 3 wherein at least one of the first seal and second seal are cup seals.

5. The pump of claim 4 wherein the cup seals are constructed out of PEEK.

6. The pump of claim 3 including a backup seal for either or both of the first and second seals.

7. The pump of claim 6 wherein the backup seal is an o-ring seal.

8. The pump of claim 7 wherein the o-ring seal is formed from EPDM or HNBR.

9. The pump of claim 3 wherein either a support for the first seal or a support for the second seal is designed to relieve a pressure within the cavity when the pressure exceeds a predetermined value.

10. The pump of claim 1 wherein the material is in thermal communication with the fluid.

11. The pump of claim 1 including a spring supported within the cylinder and configured to bias the piston in a direction to maintain the spacer disposed between the confronting ends of the split ring while the material remains below the preselected temperature.

12. The pump of claim 11 wherein the force exerted on the piston is substantially greater than a force exerted by the spring.

13. The pump of claim 1 wherein at least a portion of a wall of the cavity has a reduced thickness that will bulge outward when pressure within the cavity exceeds a design value to reduce the pressure within the cavity to a safe level.

14. The pump of claim 1 including a safety lock that is configured to prevent the piston from moving in the cylinder in a direction that will remove the spacer from between the confronting ends of the split ring when the fluid temperature is below the preselected temperature and passively unlock the piston to enable the piston to remove the spacer from between the confronting ends of the split ring when the fluid temperature is approximately equal to or above the preselected temperature.

15. The pump of claim 14 wherein the safety lock is thermally activated and comprises a pin that is suspended from one end of the cylinder, in the direction that the piston moves to remove the spacer from the confronting ends of the split ring, the pin extending partially within a recess in an end of the piston, a substantial remainder of the recess being substantially filled with a thermally activated material, wherein the thermally activated material has a viscosity at temperatures below the preselected temperature that prevents the thermally activated material from flowing alongside a side of the pin and out of the recess, and at temperatures substantially at or above the preselected temperature the thermally activated material has a reduced viscosity that enables it to flow alongside the side of the pin and out of the recess enabling the piston to remove the spacer from between the confronting ends of the split ring.

16. The pump of claim 15 wherein the thermally activated material is a polymer.

17. The pump of claim 16 wherein the polymer is polyethylene.

18. The pump of claim 14 wherein the safety lock comprises a shear pin that is configured to form an obstruction that prevents the piston from removing the spacer from between the confronting ends when the material is substantially below the preselected temperature, wherein when the force on the piston is large enough to move the piston in a direction to remove the spacer from between the confronting ends, the shear pin is configured to rupture or otherwise deform to remove the obstruction.

19. The pump of claim 18 wherein the safety lock comprises a pin that is suspended from one end of the cylinder, in the direction that the piston moves to remove the spacer from the confronting ends of the split ring, wherein substantially below the preselected temperature the pin extends partially within a recess in an end of the piston, a substantial remainder of the recess being substantially accessible to accommodate piston travel, the pin is configured with projections in the form of one or more shear pins or rings which prevent the pin from substantially moving into the substantial remainder of the recess when the material is substantially below the preselected temperature and wherein the pins are configured to rupture or otherwise deform to enable piston travel into the substantial remainder of the recess when the force on the piston is large enough to move the piston in the direction to remove the spacer from between the confronting ends.

20. The pump of claim 1 including:
a generally rigid retaining ring encircling and spaced along the shaft upstream, in a direction of flow of the fluid, from the split ring, the retaining ring having an inner diameter spaced from the shaft when the shaft is rotating, the inner diameter defining a portion of the annulus; and
a pliable polymer ring surrounding the shaft and positioned between the split ring and the retaining ring, the polymer ring having an inner diameter spaced from the shaft when the shaft is rotating, the inner diameter defining a portion of the annulus, the pliable polymer ring being urged toward the shaft by a pressure differential across the polymer ring when the split ring is constricted and moves into the annulus towards the shaft.

21. A shutdown seal for a pump having an impeller section which is connected to a motor through a shaft that is rotatably supported between the motor and the impeller with a seal housing interposed around the shaft between the motor and the impeller section, the seal housing surrounding an axial portion of the rotating shaft, the shutdown seal being configured to be supported within the seal housing for preventing a fluid in an annulus surrounding the shaft from leaking past the shutdown seal after rotation of the shaft has slowed or stopped, the shutdown seal comprising:
a constrictable split ring configured to surround the shaft, the split ring having confronting ends and an inner diameter that will be spaced from the shaft when installed in the pump and the shaft is rotating, the inner diameter defining a portion of the annulus;
a spacer disposed between the confronting ends of the split ring for maintaining the annular space between the confronting ends during normal operation of the shaft, the spacer is operable to be removed from between the confronting ends when the fluid rises above a pre-selected temperature so the split ring can constrict to narrow or substantially seal a portion of the annulus;

an actuator for removing the spacer from between the confronting ends of the split ring when the fluid rises above the pre-selected temperature so the split ring can constrict to narrow or substantially seal the portion of the annulus, the actuator comprising:

a cylinder having an axial dimension;

a piston axially movable within the cylinder with the cylinder having an upper and a lower end which is sealed around the piston, the piston connecting at one end with the spacer;

a cavity occupying a space within the cylinder between the upper and lower ends and which space at least partially surrounds a portion of the piston, an axial dimension of the piston extending through the space within the cavity when the spacer is disposed between the confronting ends of the split ring, having at least two separate diameters with a largest of the diameters leading a smaller of the diameters in a direction of travel of the piston to remove the spacer from the confronting ends of the split ring; and a material occupying at least a portion of the space within the cavity, the material expanding upon an increase in temperature to exert a force on the piston that causes the piston to move in the direction to remove the spacer from between the confronting ends when the material rises above a pre-established temperature and wherein the piston extends axially through the material occupying at least a portion of the space within the cavity.

* * * * *